(12) United States Patent  (10) Patent No.: US 10,249,949 B2
Li et al.  (45) Date of Patent: Apr. 2, 2019

(54) MICROWAVE MODULATION DEVICE

(71) Applicant: InnoLux Corporation, Miao-Li County (TW)

(72) Inventors: I-Yin Li, Miao-Li County (TW); Chia-Chi Ho, Miao-Li County (TW); Chin-Lung Ting, Miao-Li County (TW); Yan-Zheng Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/869,786

(22) Filed: Jan. 12, 2018

(65) Prior Publication Data

US 2018/0205148 A1  Jul. 19, 2018

Related U.S. Application Data

(60) Provisional application No. 62/446,581, filed on Jan. 16, 2017.

(30) Foreign Application Priority Data

Mar. 14, 2017 (CN) .......................... 2017 1 0149941
Oct. 10, 2017 (CN) .......................... 2017 1 0935356

(51) Int. Cl.
*H04B 1/04* (2006.01)
*H01Q 3/44* (2006.01)
*H01Q 9/16* (2006.01)
*H01Q 7/00* (2006.01)
*H01Q 9/27* (2006.01)
*H04B 1/034* (2006.01)
*H04B 13/00* (2006.01)
*H04B 7/0404* (2017.01)

(52) U.S. Cl.
CPC ................. *H01Q 3/44* (2013.01); *H01Q 7/00* (2013.01); *H01Q 9/16* (2013.01); *H01Q 9/27* (2013.01); *H04B 1/034* (2013.01); *H04B 7/0404* (2013.01); *H04B 13/00* (2013.01)

(58) Field of Classification Search
CPC ............... H01Q 3/44; H01Q 7/00; H01Q 9/16
USPC ...................................................... 455/129
See application file for complete search history.

(56) References Cited

U.S. PATENT DOCUMENTS

2018/0138593 A1* 5/2018 Nakazawa ............... H01Q 3/44

* cited by examiner

*Primary Examiner* — Sanh D Phu
(74) *Attorney, Agent, or Firm* — McClure, Qualey & Rodack, LLP

(57) ABSTRACT

A microwave modulation device includes a first radiator; a second radiator disposed on the first radiator; a third radiator disposed on the second radiator; a support structure disposed between the first radiator and the second radiator; and a modulation structure disposed between the second radiator and the third radiator. A microwave-transmission layer is located among the space defined by the first radiator, the second radiator, and the support structure. The microwave-transmission layer is gas, substantially vacuum, liquid or insulating material.

19 Claims, 13 Drawing Sheets

MICROWAVE MODULATION DEVICE

CROSS-REFERENCE TO RELATED APPLICATIONS

This application claims the benefit of U.S. Provisional Application No. 62/446,581 filed on Jan. 16, 2017, the entirety of which is incorporated by reference herein. This Application claims priority of China Patent Application No. 201710149941.5 filed on Mar. 14, 2017, and Application No. 201710935356.8 filed on Oct. 10, 2017, the entirety of which is incorporated by reference herein.

BACKGROUND

Field of the Invention

The present disclosure relates to a microwave device, and in particular to a microwave modulation device.

Description of the Related Art

In microwave modulation devices, liquid-crystal antenna units are utilized. The rotation of the liquid-crystal units can be controlled by an electric field, and thus the dielectric constants of the liquid-crystal antenna units can be changed according to the characteristics of the double dielectric constants of the liquid-crystal units. Moreover, the arrangement of the liquid-crystal units is controlled by electrical signals so as to change the dielectric constant of each unit of the microwave systems. Therefore, the phases or amplitudes of the microwave signals of the microwave modulation device can be controlled. The transmitting directions of the wavefronts emitted by the microwave modulation device are defined as the directions of maximum intensity of radiation pattern of the microwave modulation device.

By controlling the radiation directions of the microwave modulation device, the strongest microwave signals can be searched for. The receiving or radiation directions can be adjusted according to the signal source, and thus the communication quality is enhanced. The signal source can be a satellite in space, a base station on the ground, or another signal source.

Wireless communication via the microwave modulation devices can be used in many different kinds of vehicle, such as airplanes, yachts, ships, trains, cars, and motorcycles, or applied on internet of things (IoT), autopilot, or autonomous vehicles. Electronic microwave modulation devices have many advantages over conventional mechanical antennas, such as being flat, lightweight, and thin, and having a short response time.

Although existing microwave modulation devices have been generally adequate for their intended purposes, they have not been entirely satisfactory in all respects. Consequently, it is desirable to provide a solution for improving microwave modulation devices.

BRIEF SUMMARY

The present disclosure provides a microwave modulation device including a first radiator, a second radiator, a third radiator, a support structure, and a modulation structure. The second radiator is disposed on the first radiator. The third radiator is disposed on the second radiator. The support structure is disposed between the first radiator and the second radiator. The modulation structure is disposed between the second radiator and the third radiator. A microwave-transmission layer is located in the space defined by the first radiator, the second radiator, and the support structure. The microwave-transmission layer is gas, substantially vacuum, liquid or heat insulating material.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
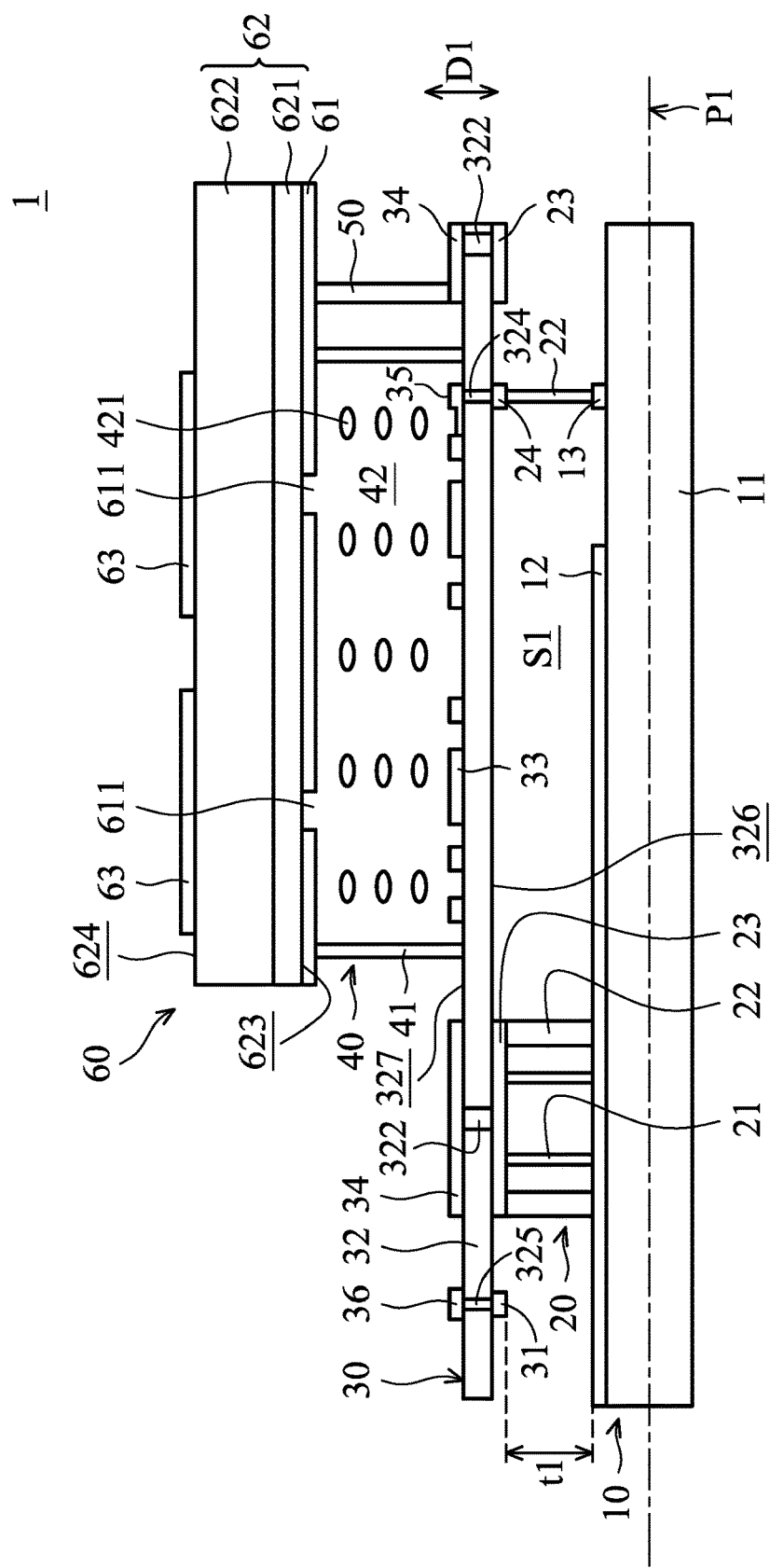
FIG. 1 is a schematic diagram of a microwave modulation device in accordance with a first embodiment of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to another element(s) or feature(s) as illustrated in the figures. The spatially relative terms are intended to encompass different orientations of the device in use or operation in addition to the orientation depicted in the figures. For clearly, the first feature disposed on or under the second feature of the disclosure means the first feature disposed on or under the second feature of the disclosure along the stacking direction in figures.

The shape, size, and thickness in the drawings may not be drawn to scale or simplified for clarity of discussion; rather, these drawings are merely intended for illustration.

FIG. 1 is a schematic diagram of a microwave modulation device 1 in accordance with a first embodiment of the disclosure. The microwave modulation device 1 can be a liquid crystal antenna device. The microwave modulation device 1 is configured to emit microwave signals. The frequency range of microwave signals is in a range from about 300 MHz to 300 GHz. In another embodiment, the frequency range of the microwave signals is in a range from about 10 GHz to 40 GHz.

The microwave modulation device 1 includes a first radiator 10, a first support structure 20, a second radiator 30, a modulation structure 40, and a conductive connection element 50, and a third radiator 60.

Figure 2:
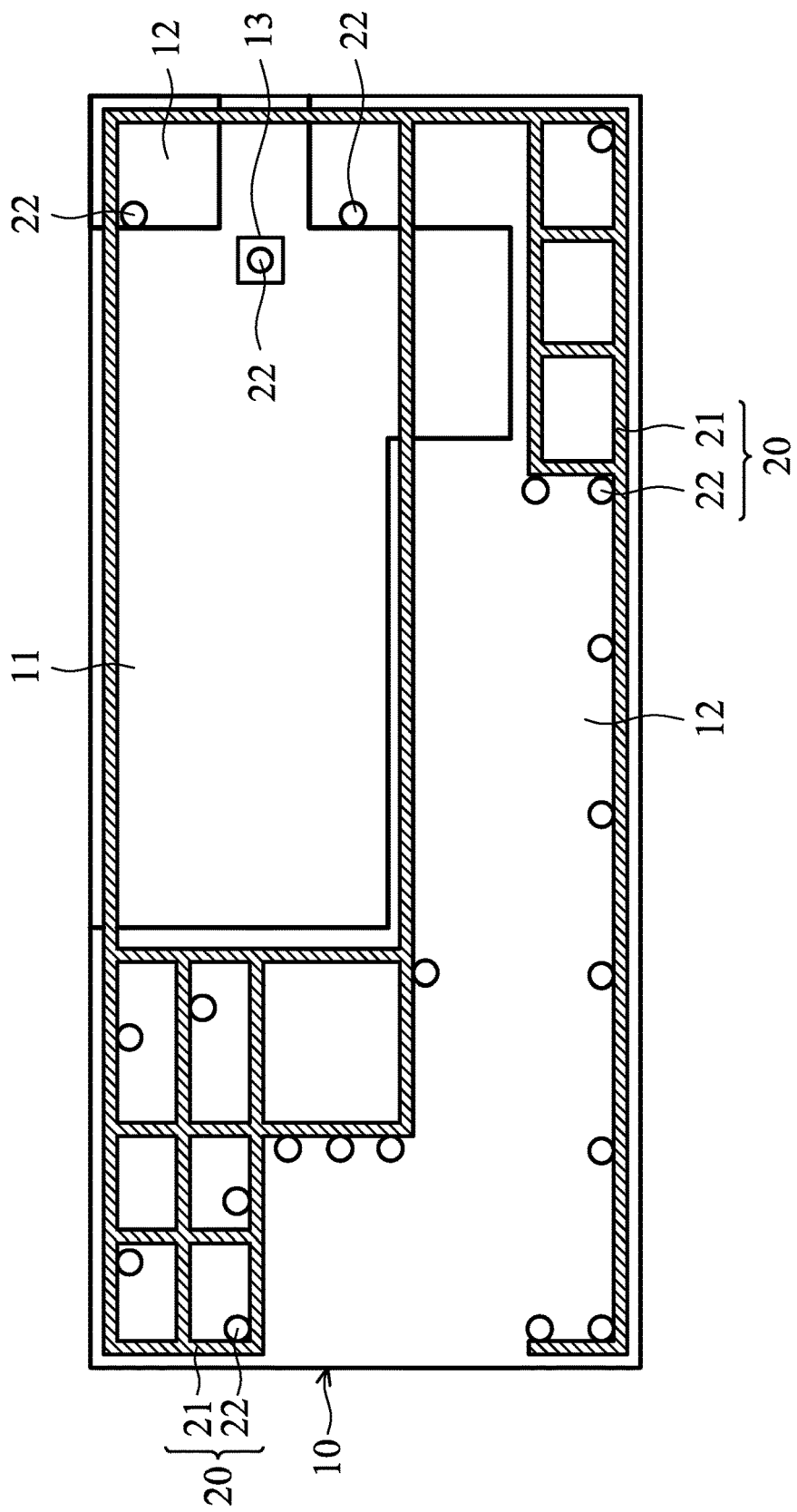
FIG. 2 is a top view of the first radiator in accordance with the first embodiment of the disclosure.

FIG. 2 is a top view of the first radiator 10 in accordance with the first embodiment of the disclosure. The first radiator 10 extends along a reference plane P1. The first support structure 20 is disposed on the first radiator 10. The second radiator 30 is disposed on the first support structure 20. The second radiator 30 is parallel to the first radiator 10. A microwave-transmission layer S1 is located among the space defined by the first radiator 10, the second radiator 30, and the first support structure 20. The microwave-transmission layer S1 is configured for transmitting microwave signals. In some embodiments, the microwave-transmission layer S1 is gas, substantially vacuum, liquid or heat-insulating material.

In some embodiments, the microwave-transmission layer S1 can be filled with microwave-low-loss materials. The microwave-low-loss materials can be gas, liquid or solid. When the microwave signals are transmitted in the microwave-low-loss materials, the loss tangent (tan θ) of the microwave signals are lower than 0.01. In some embodiments, the loss tangent (tan θ) of the microwave signals are lower than 0.005. In some embodiments, the microwave-transmission layer S1 is a fluid layer. The microwave-transmission layer S1 can be filled with gas or liquid. For example, the gas can be nitrogen or air, but it is not limited thereto. When the microwave-transmission layer S1 is filled with gas, the microwave-transmission layer S1 can be a gas layer with heat-insulation functions. Therefore, the temperature of the modulation structure 40 influenced by ambient temperature is reduced, and thus the quality of the microwave signals is improved. In some embodiments, the microwave-transmission layer S1 is vacuum or substantially vacuum.

In some embodiments, when the microwave-transmission layer S1 is be filled with liquid, the microwave-transmission layer S1 is a liquid layer. For example, the liquid can be water, but it is not limited thereto. Because of the liquid flowing between the first radiator 10 and the second radiator 30, the temperatures of the second radiator 30 and the modulation structure 40 are stable and uniform, and thus the quality of the microwave signals is improved.

In some embodiments, the microwave-transmission layer S1 is solid. The microwave-transmission layer S1 can be filled with solid. The solid can be insulation Materials and heat-insulation Materials. For example, the solid can be glass fibers, foam with low loss tangent, but it is not limited thereto. When the microwave-transmission layer S1 is be filled with solid, the microwave-transmission layer S1 is a solid layer with heat-insulation functions. Therefore, the temperature of the modulation structure 40 influenced by ambient temperature is reduced, and thus the quality of the microwave signals is improved. Moreover, the strength of the structure of the microwave modulation device 1 can be enhanced by the microwave-transmission layer S1.

The first radiator 10 includes a first substrate 11, a first metal layer 12, and a thin film transistor 13. The first substrate 11 extends along the reference plane P1. The first substrate 11 is made of rigid material. In some embodiments, the first substrate 11 is made of glass, metal materials or other insulation materials, but it is not limited thereto.

The first metal layer 12 is disposed on the first substrate 11. The first metal layer 12 may be a thin structure. The first metal layer 12 covers over ¼ or ⅕ of the area of the first substrate 11. In some embodiments, the first metal layer 12 is grounded. Moreover, the thin film transistor 13 is disposed on the first substrate 11. It should be noticed that the first metal layer 12 and the first substrate 11 could be formed as a single piece when the first substrate 11 includes metal material(s).

The first support structure 20 is disposed on the first radiator 10, and connected to the second radiator 30. In other words, the first support structure 20 is located between the first radiator 10 and the second radiator 30. The first support structure 20 extends along a stacking direction D1. The stacking direction D1 is perpendicular to the reference plane P1. In other words, the stacking direction D1 is also the normal direction of the first substrate 11. In this embodiment, the first support structure 20 is disposed on the first metal layer 12.

The first support structure 20 includes at least one support element 21, conductive-support lumps 22, grounding support layers 23, and modulation-signal conductive layers 24. The support element 21 is disposed on the first metal layer 12, and connected to the grounding support layers 23. In other words, the support element 21 is located between the first metal layer 12 and the grounding support layers 23. In this embodiment, the support element 21 can be disposed on the first substrate 11. In some embodiments, the support element 21 is made of insulation materials, rigid materials, or rigid insulation materials. The support element 21 is configured to maintain a space between the first radiator 10 and the second radiator 30, and to maintain the distance between the first radiator 10 and the second radiator 30 so as to form a space which the microwave-transmission layer S1 could be disposed between the first radiator 10 and the second radiator 30. It should be noticed that the first metal layer 12, the first substrate 11 and the support element 21 could be formed as a single piece when the support element 21 includes metal material(s).

In this embodiment, the support element 21 may be, but is not limited to being, a grid structure, an elongated structure, or a mass structure. In some embodiments, the first support structure 20 includes support elements 21 separated from each other. In some embodiments, the support element 21 overlaps with the first metal layer 12 and the grounding support layers 23. The conductive-support lumps 22 pass through or are embedded in the support element 21.

The conductive-support lumps 22 are disposed on the first metal layer 12, and connected to the grounding support layers 23. In other words, the conductive-support lumps 22 are located between the first metal layer 12 and the grounding support layer 23. In some embodiments, the conductive-support lumps 22 are connected to the second radiator 30.

The conductive-support lumps 22 may be post structures extending along the stacking direction D1. The conductive-support lumps 22 are made of the conductive materials, rigid materials, or rigid conductive materials.

The grounding support layer 23 is disposed on the conductive-support lump 22. The grounding support layer 23 may be a thin film structure disposed on the first surface 326 of the second radiator 30 facing the first radiator 10 (the first substrate 11). The modulation-signal conductive layer 24 is disposed on the conductive-support lump 22. The modulation-signal conductive layer 24 may be a thin film structure disposed on the first surface 326 of the second radiator 30 facing the first radiator 10.

Figure 3A:
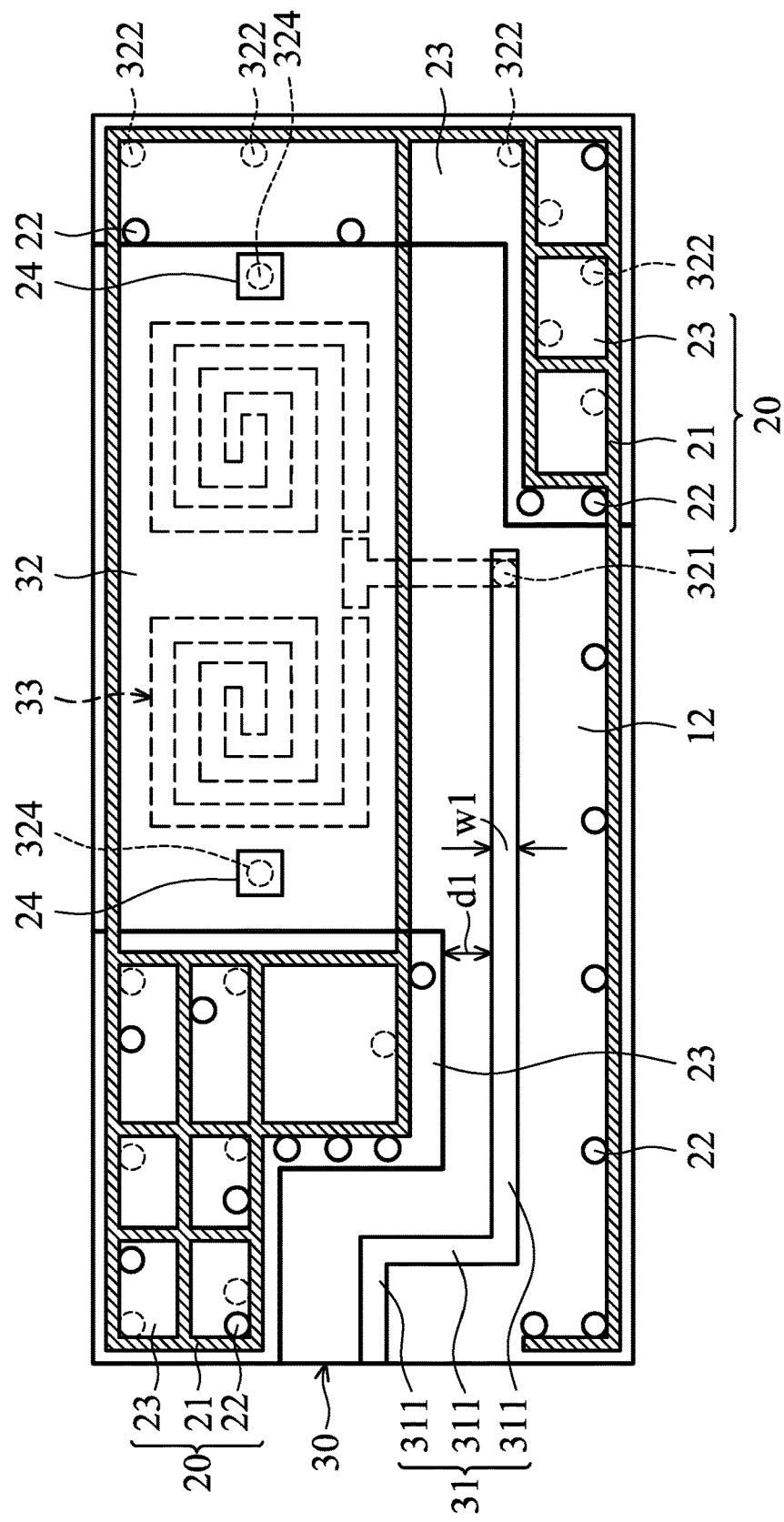
FIG. 3A is a bottom view of a second radiator in accordance with the first embodiment of the disclosure.
Figure 3B:
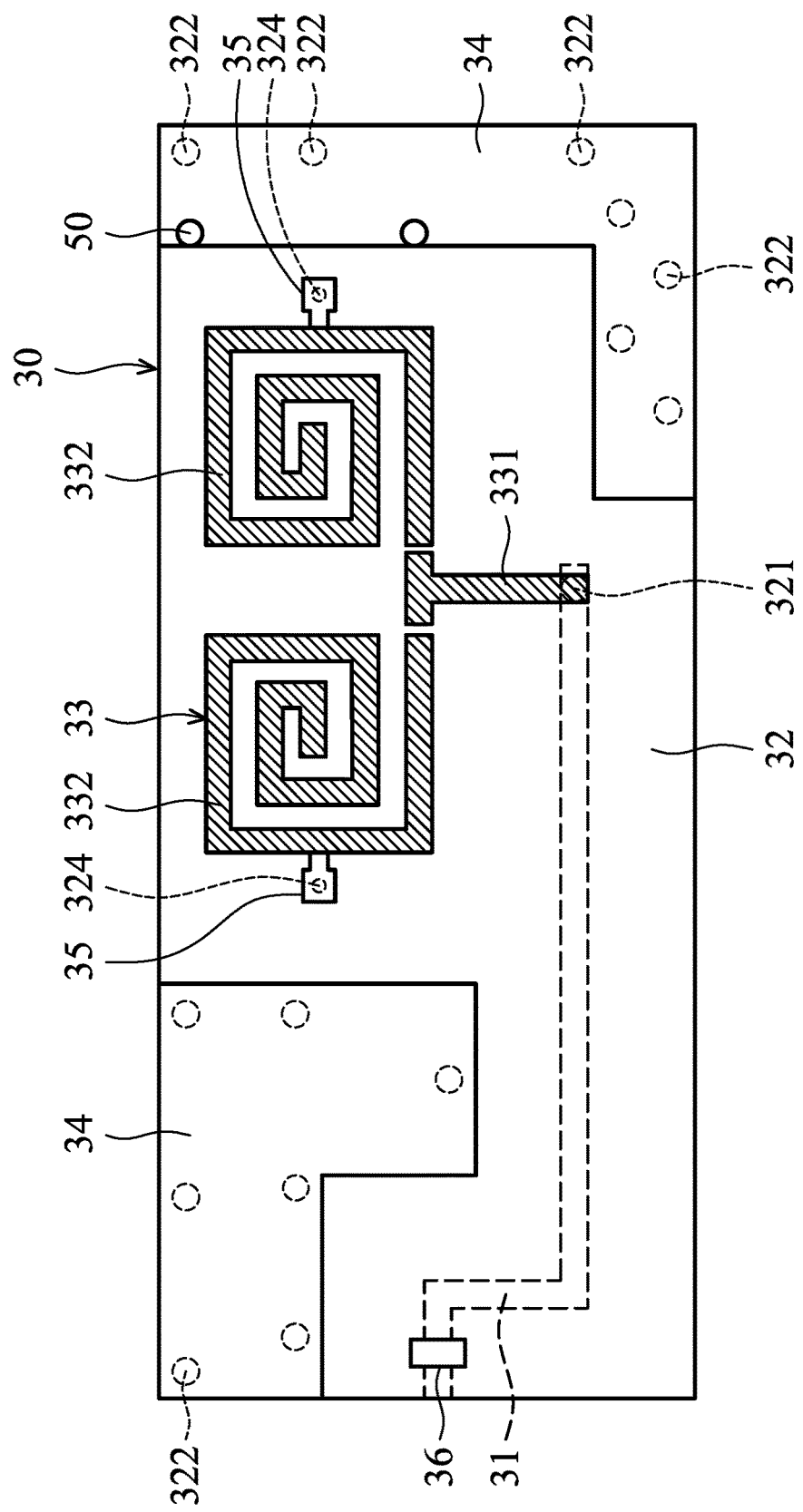
FIG. 3B is a top view of the second radiator is accordance with the first embodiment of the disclosure.

FIG. 3A is a bottom view of the second radiator 30 in accordance with the first embodiment of the disclosure. FIG. 3B is a top view of the second radiator 30 is accordance with the first embodiment of the disclosure. In this embodiment, the second radiator 30 may be a flexible printed-circuit-board structure. The second radiator 30 includes a second metal layer 31, a second substrate 32, a radiation conductive layer 33, grounding layer 34, a connection layer 35, and a signal-receiving layer 36.

The second metal layer 31 is disposed on the first surface 326 of the second substrate 32 facing the first radiator 10. The second metal layer 31 may be a thin film structure (as shown in FIG. 1). The second metal layer 31 may be an elongated structure (as shown in FIG. 3A). In this embodiment, one end of the second metal layer 31 is located adjacent to the edge of the second substrate 32, and the other end of the second metal layer 31 connects to a first signal hole 321 of the second substrate 32. The second metal layer 31 includes a plurality of linear sections 311. One of the linear sections 311 is perpendicular to another linear section 311. In this embodiment, the second metal layer 31, the first metal layer 12, and the microwave-transmission layer S1 are formed as a low-loss transmission-line structure.

The second metal layer 31 is separated from the grounding support layer 23 of the first support structure 20. The distance d1 between the second metal layer 31 and the grounding support layer 23 is greater than, but is not limited to being, 2 or 3 times the width w1 of the second metal layer 31. The conductive-support lumps 22 are disposed, but are not limited to being, along the edge of the grounding support layers 23.

The second substrate 32 is parallel to the first substrate 11, and is separated from the first substrate 11. Moreover, the second substrate 32 may be disposed on the support element 21, the conductive-support lumps 22, and/or the grounding support layers 23.

The second substrate 32 is made of glass materials, or other insulation materials. The second substrate 32 includes polyimide (PI), glass, or liquid-crystal polymer. In some embodiments, the second substrate 32 is flexible. The thickness of the first substrate 11 is greater than the thickness of the second substrate 32. In some embodiments, the thickness of the first substrate 11 may be greater than 1.5 times the thickness of the second substrate 32.

In one embodiment, a distance between the first radiator 10 and the second radiator 30 is waveguide thickness t1. In this embodiment, the waveguide thickness t1 is a distance between the first metal layer 12 and the second metal layer 31. In some embodiments, the microwave modulation device 1 excludes the second metal layer 31. The waveguide thickness t1 is a distance between the first metal layer 12 and the radiation conductive layer 33 (or the grounding layer 34). In the embodiment, which the microwave modulation device 1 excludes the second metal layer 31, the ratio of the thickness of the second substrate 32 to the waveguide thickness t1 is in a range from 0.001 to 0.5. The thicknesses and the waveguide thickness t1 are measured parallel to the stacking direction D1.

The radiation conductive layer 33 is disposed on the second surface 327 of the second substrate 32 away from the first radiator 10 (or the first substrate 11), and is in contact with the modulation structure 40. The radiation conductive layer 33 may be a thin film structure. The radiation conductive layer 33 includes one or more connection sections 331 and radiation sections 332. The second substrate 32 includes at least one first signal hole 321. The conductive materials may be disposed in the first signal hole 321. The conductive materials may completely fill the first signal hole 321, or partially fill the first signal hole 321. For example, the conductive materials are coated on the inner wall of the first signal hole 321. Therefore, the connection section 331 is connected to the second metal layer 31 via the conductive materials in the first signal hole 321.

The radiation section 332 may be spiral. In this embodiment, one end of the radiation section 332 is adjacent to the connection section 331, and is separated from the connection section 331. In some embodiments, one end of the radiation section 332 is connected to the connection section 331.

In this embodiment, the first metal layer 12 and the grounding support layer 23 are arranged in the stacking direction D1, and are not disposed under the radiation conductive layer 33 (not overlap with the radiation conductive layer 33). Therefore, interference with the microwave signals is reduced.

The grounding layer 34 is disposed on the second surface 327 of the second substrate 32. The grounding layer 34 may be a thin film structure. The grounding layer 34 covers the grounding hole 322 of the second substrate 32. The grounding hole 322 can be filled with conductive materials, and the grounding layer 34 is connected to the grounding support layer 23 via the conductive materials within the grounding hole 322. Moreover, the grounding layer 34 is separated and isolated from the radiation conductive layer 33.

The connection layer 35 is disposed on the second substrate 32, and is in contact with the modulation structure 40. The connection layer 35 may be a thin film structure. The second substrate 32 includes at least one second signal hole 324. The second signal hole 324 can be filled with conductive materials. Therefore, the connection layer 35 is connected to the modulation-signal conductive layers 24 via the conductive materials in the second signal hole 324. Moreover, the connection layer 35 is connected to the radiation conductive layer 33. The conductive materials filled in the second signal hole 324 may be different from the conductive materials filled in the grounding hole 322 and the first signal hole 321. The conductivity of the conductive materials filled in the grounding hole 322 and/or the first signal hole 321 is greater than the conductivity of the conductive materials filled in the second signal hole 324.

In this embodiment, the thin film transistor 13 is connected to the radiation conductive layer 33 via the conductive-support lump 22, the modulation-signal conductive layer 24, the second signal hole 324, and the connection layer 35 so as to transmit modulation-control signals from the thin film transistor 13 to the radiation conductive layer 33.

The signal-receiving layer 36 is disposed on the second surface 327 of the second substrate 32. The signal-receiving layer 36 may be a thin film structure. The second substrate 32 further includes at least one third signal hole 325. The third signal hole 325 is filled with the conductive material, and thus the signal-receiving layer 36 is connected to the second metal layer 31 via the conductive materials in the third signal hole 325.

In this embodiment, the second radiator 30 and the third radiator 60 are displaced in the stacking direction D1. Since the grounding layer 34 is not covered by the third radiator 60 in the stacking direction D1, the grounding layer 34 can easily be grounded. Moreover, the first metal layer 12 is connected to the grounding layer 34 via the conductive materials in the grounding hole 322, and thus the grounding path of the first metal layer 12 is shortened, and the first metal layer 12 has a better grounding effect. The second metal layer 31 is connected to the signal-receiving layer 36 via the third signal hole 325, and thus the radiation signal can be easily fed to the third radiator 60.

Moreover, the manufacturing cost of the second radiator 30 is decreased because the second radiator 30 is a printed circuit board structure or a flexible printed-circuit-board structure. Moreover, because the material of the second substrate 32 can be polyimide (PI), glass or liquid-crystal polymer, the conductive holes, such as grounding hole 322, second signal hole 324, and third signal hole 325, can be formed more easily on the second substrate 32 than on substrates made of glass. Therefore, the difficulty of manufacturing the microwave modulation device 1 is reduced, and the designs of various signal wires are more flexible.

The modulation structure 40 is located between the second radiator 30 and the third radiator 60. The modulation structure 40 includes a sealing wall 41 and modulation materials 42. The sealing wall 41 may be a ring structure connected to the second radiator 30 and the third radiator 60. The sealing wall 41 may be made of plastic materials with or without adhesion. The sealing wall 41 is made of but not limited to a single material or a composite layer of materials, such as Polyethylene Terephthalate (PET), Polyethylene (PE), Polyethersulfone (PES), Polycarbonate (PC), Polymethylmethacrylate (PMMA), or glass. A space containing the modulation material 42 can be defined by the sealing wall 41, the second radiator 30, and the third radiator 60. The modulation material 42 can be liquid-crystal materials. The sealing wall 41 surrounds the modulation material 42, and is configured to prevent the modulation material 42 from flowing out of the modulation structure 40. The modulation material 42 includes modulation molecules 421. In this embodiment, the modulation molecules 421 are liquid-crystal molecules.

The conductive connection element 50 is connected to the second radiator 30 and the third radiator 60. The conductive connection element 50 is disposed on the grounding layer 34. In some embodiments, the conductive connection element 50 is disposed on the second substrate 32. The conductive connection element 50 is made of conductive materials mixed with insulation materials. In some embodiments, the conductive connection element 50 includes, but is not limited to being, copper, silver, gold, or alloys thereof.

Figure 4A:
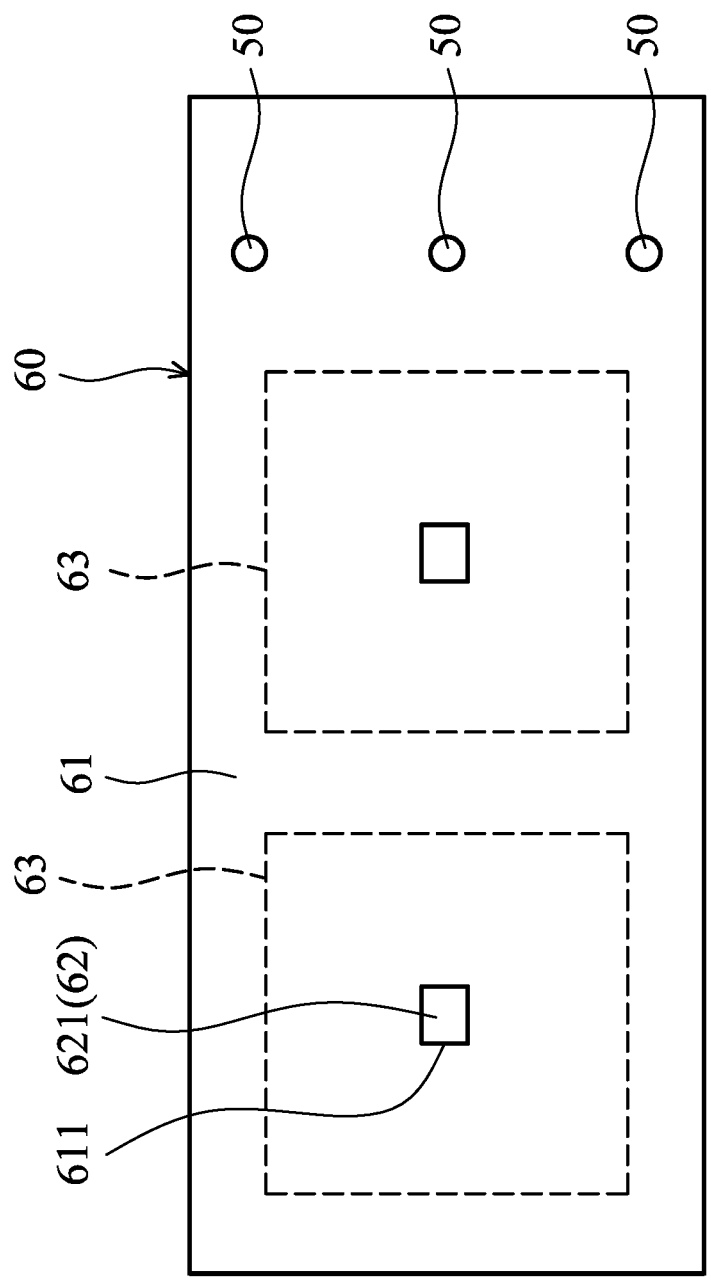
FIG. 4A is a bottom view of a third radiator in accordance with the first embodiment of the disclosure.
Figure 4B:
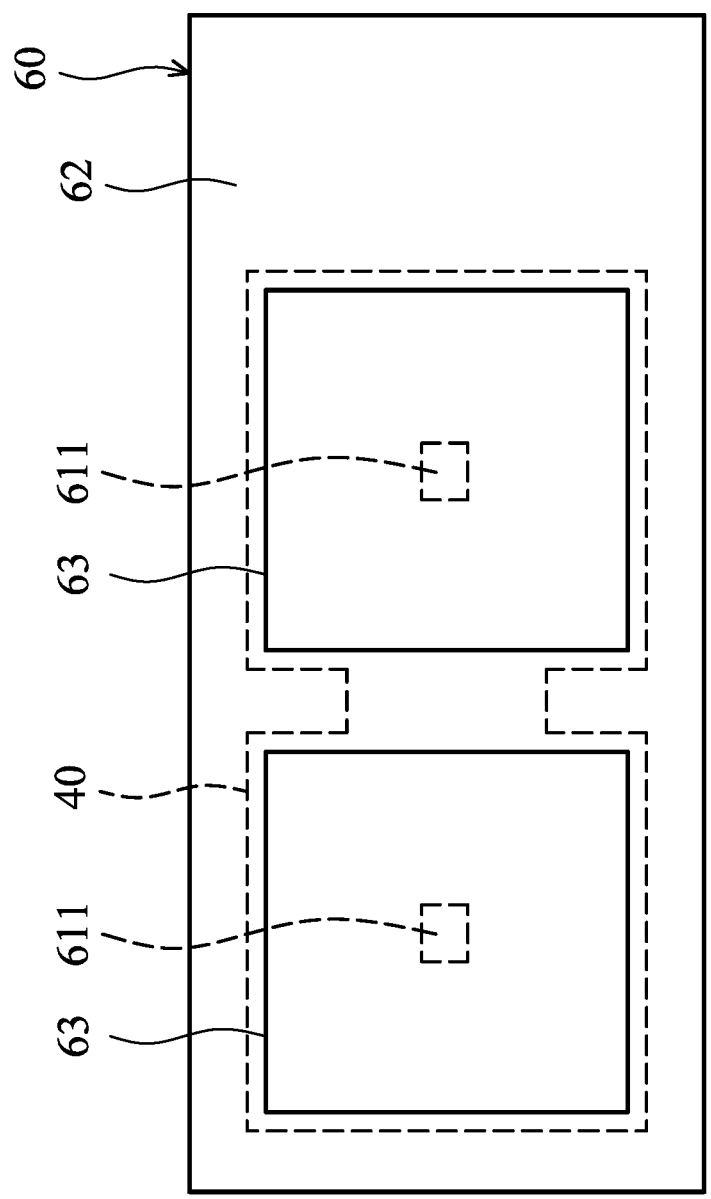
FIG. 4B is a top view of the third radiator in accordance with the first embodiment of the disclosure.

FIG. 4A is a bottom view of the third radiator 60 in accordance with the first embodiment of the disclosure. FIG. 4B is a top view of the third radiator 60 in accordance with the first embodiment of the disclosure. The third radiator 60 is disposed on the modulation structure 40 and the conductive connection element 50. The third radiator 60 is parallel to the second radiator 30, and separated from the second radiator 30. The third radiator 60 includes a third metal layer 61, a third substrate 62, and a radiation-signal layer 63.

The third metal layer 61 is disposed on the modulation structure 40. The third metal layer 61 may be a thin film structure disposed on the third surface 623 of the third substrate 62 facing the second radiator 30 (the second substrate 32). The third metal layer 61 covers over half the area of the third surface 623. In some embodiments, the third metal layer 61 covers over ⅘ of the area of the third surface 623.

In this embodiment, the third metal layer 61 is connected to the conductive connection element 50. Therefore, the third metal layer 61 is electrically connected to the grounding layer 34 via the conductive connection element 50. The third metal layer 61 includes an opening area 611 corresponding to one end of the radiation section 332.

The third substrate 62 is parallel to the second substrate 32, and separated from the second substrate 32. In some embodiments, the third substrate 62 includes glass materials, or other insulation materials. In this embodiment, the third substrate 62 includes polyimide (PI) or liquid-crystal polymer. In some embodiments, the third substrate 62 is flexible.

The third substrate 62 includes a flexible substrate 621 and a rigid substrate 622. The flexible substrate 621 includes polyimide (PI) or liquid-crystal polymer. The flexible substrate 621 is disposed between the third metal layer 61 and the rigid substrate 622.

In some embodiments, the thickness of the rigid substrate 622 is greater than the thickness of the flexible substrate 621. In some embodiments, the thickness of the rigid substrate 622 is greater than 1.5 or 2 times the thickness of the flexible substrate 621. The thickness of the flexible substrate 621 is substantially equal to the thickness of the second substrate 32.

The radiation-signal layer 63 is disposed on the fourth surface 624 of the third substrate 62 away from the second radiator 30 (the second substrate 32). The radiation-signal layer 63 may be a thin film structure. In this embodiment, the radiation-signal layer 63 is disposed on the rigid substrate 622. In this embodiment, the center of the radiation-signal layer 63 is located corresponding to the opening area 611. In some embodiments, the radiation-signal layer 63 is overlaid on the opening area 611. Moreover, the radiation-signal layer 63 is located on the radiation section 332 of the radiation conductive layer 33 and the modulation structure 40 in the stacking direction D1. As shown in FIGS. 1 and 4B, the location of the radiation-signal layer 63 corresponds to the location of the radiation section 332.

In this embodiment, the flexible substrate 621 and the third metal layer 61 forms a flexible printed-circuit-board structure. During the manufacturing process of the third radiator 60, the radiation-signal layer 63 is formed on the rigid substrate 622. Moreover, the third metal layer 61 is formed on the flexible substrate 621. Finally, the flexible substrate 621 adheres to the rigid substrate 622, and then the third radiator 60 is complete.

In general, it is hard to form the third metal layer 61 and the radiation-signal layer 63 on the third surface 623 and the fourth surface 624 of the rigid substrate 622. Therefore, according to the structure of the embodiment, the manufacturing processes of the third radiator 60 are simplified, and the strength of the whole structure of the microwave modulation device 1 is enhanced.

In this embodiment, the microwave signals can be fed into the microwave modulation device 1 via the second radiator 30. The microwave signal is transmitted to the second metal layer 31 via the third signal hole 325. The microwave signals are transmitted through the microwave-transmission layer S1 between the second metal layer 31 and the first metal layer 12, and are transmitted to the radiation conductive layer 33 via the first signal hole 321. In this embodiment, since the microwave signals are transmitted through the microwave-transmission layer S1, the loss of microwave signals is less than the loss of microwave signals transmitted through substrates made of glass.

The microwave signals entering into the modulation structure 40 are transmitted between the radiation conductive layer 33 and the third metal layer 61. The microwave signals are transmitted to the radiation-signal layer 63 via the opening area 611, and are emitted to the outside of the microwave modulation device 1 via the radiation-signal layer 63.

The modulation-control signals can be fed into the microwave modulation device 1 via the thin film transistor 13. The modulation-control signal can be transmitted to the radiation conductive layer 33 via the first support structure 20 to adjust the modulation structure 40. Therefore, the transmission speed of the microwave signals in the modulation structure 40 can be changed by adjusting the inclined angles of the modulation molecules 421, and thus the phase of the microwave signals can be changed.

Figure 5:
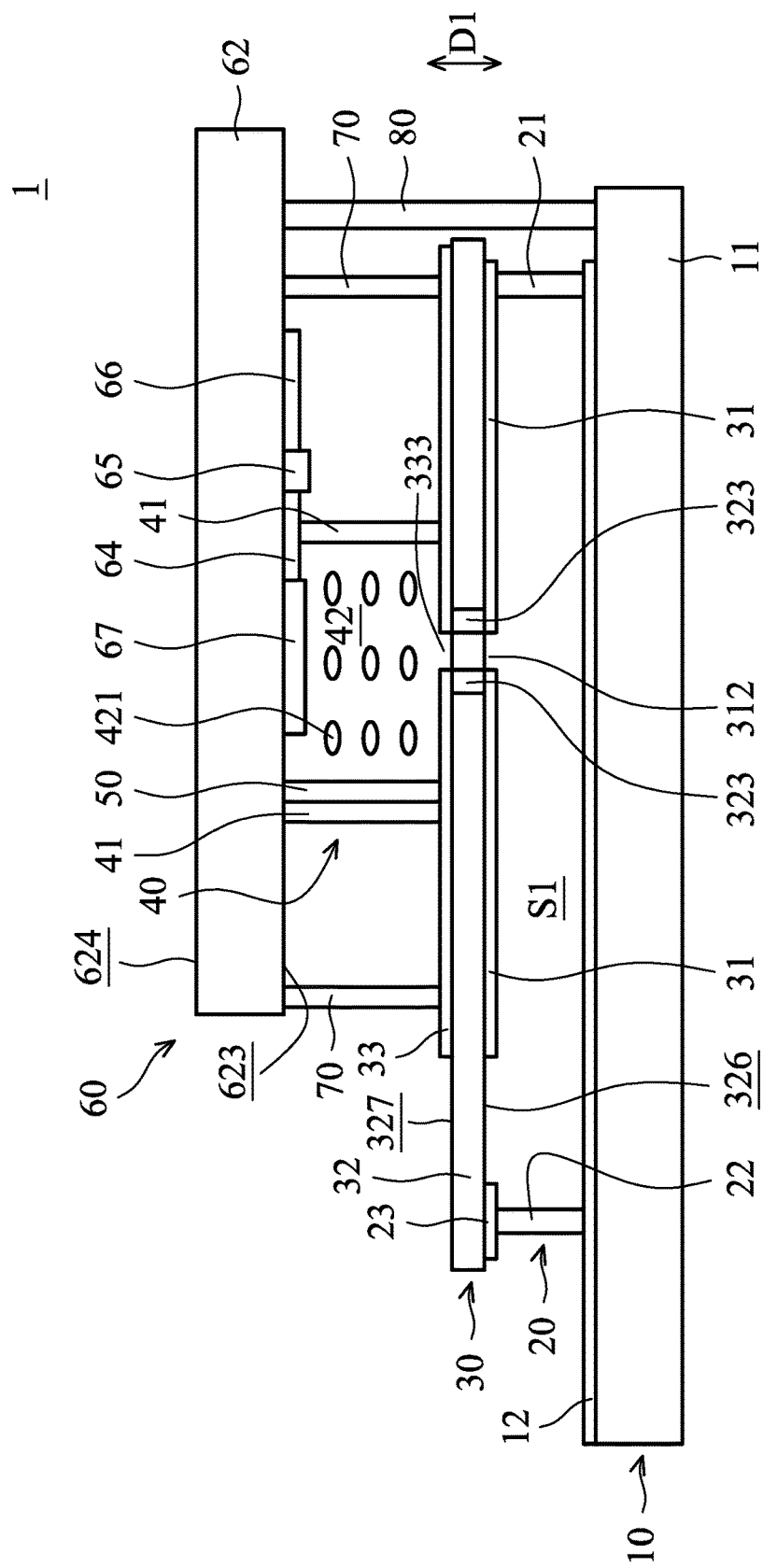
FIG. 5 is a schematic diagram of the microwave modulation device in accordance with a second embodiment of the disclosure.

FIG. 5 is a schematic diagram of the microwave modulation device 1 in accordance with a second embodiment of the disclosure. The microwave modulation device 1 further includes a second support structure 70 and a third support structure 80. The second support structure 70 is connected to the second radiator 30 and the third radiator 60. The second support structure 70 is configured to strengthen the structure of the microwave modulation device 1, and to maintain the distance between the second radiator 30 and the third radiator 60.

The second support structure 70 is disposed on the radiation conductive layer 33, and under the third substrate 62. In some embodiments, the second support structure 70 is disposed on the second substrate 32. The second support structure is made of conductive materials or insulation materials. In some embodiments, the second support structure 70 includes copper, silver, gold, or an alloy thereof, but it is not limited thereto.

The second support structure 70 can be disposed in the embodiment of FIG. 1. As shown in FIG. 1, the second support structure 70 can be disposed on the grounding layer 34, and can be disposed under the third metal layer 61.

The third support structure 80 is connected to the first radiator 10 and the third radiator 60. The third support structure 80 is made of conductive materials or insulation materials. The third support structure 80 includes copper, silver, gold, or an alloy thereof, but it is not limited thereto. In other words, the third support structure 80 is located between the first radiator 10 and the third radiator 60. In this embodiment, the third support structure 80 is directly or indirectly connected to the first substrate 11 and the third substrate 62. The third support structure 80 is configured to strengthen the structure of the microwave modulation device 1, and to maintain the distance between the first radiator 10 and the third radiator 60.

Figure 6:
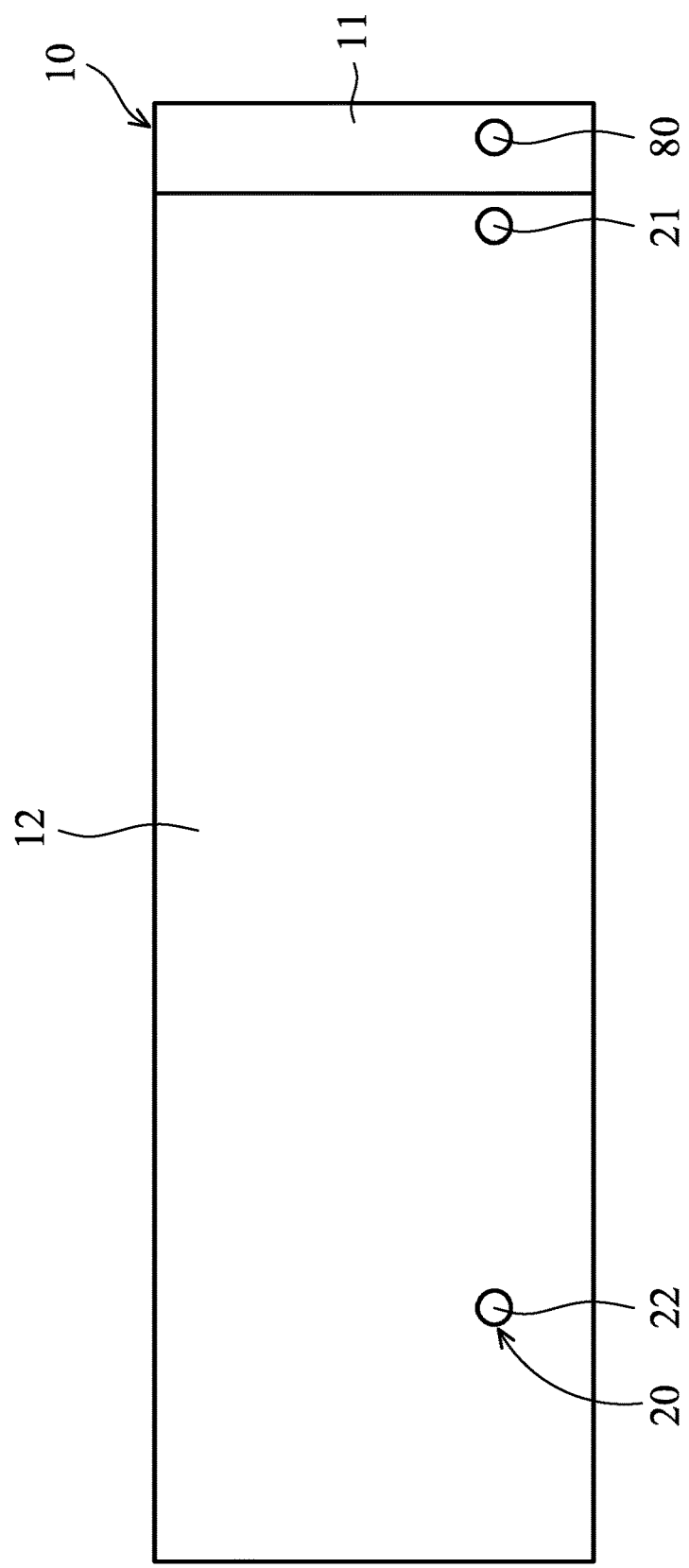
FIG. 6 is a top view of a first radiator in accordance with the second embodiment of the disclosure.

FIG. 6 is a top view of the first radiator 10 in accordance with the second embodiment of the disclosure. In this embodiment, the first metal layer 12 covers over ⅘ of the area of the first substrate 11. The support element 21 and the conductive-support lump 22 are post structures extending along the stacking direction D1. The number and shape of the support element 21 and the conductive-support lump 22 are not limited to the embodiment in FIG. 6. The number of support elements 21 and conductive-support lumps 22 may be at least two.

Figure 7A:
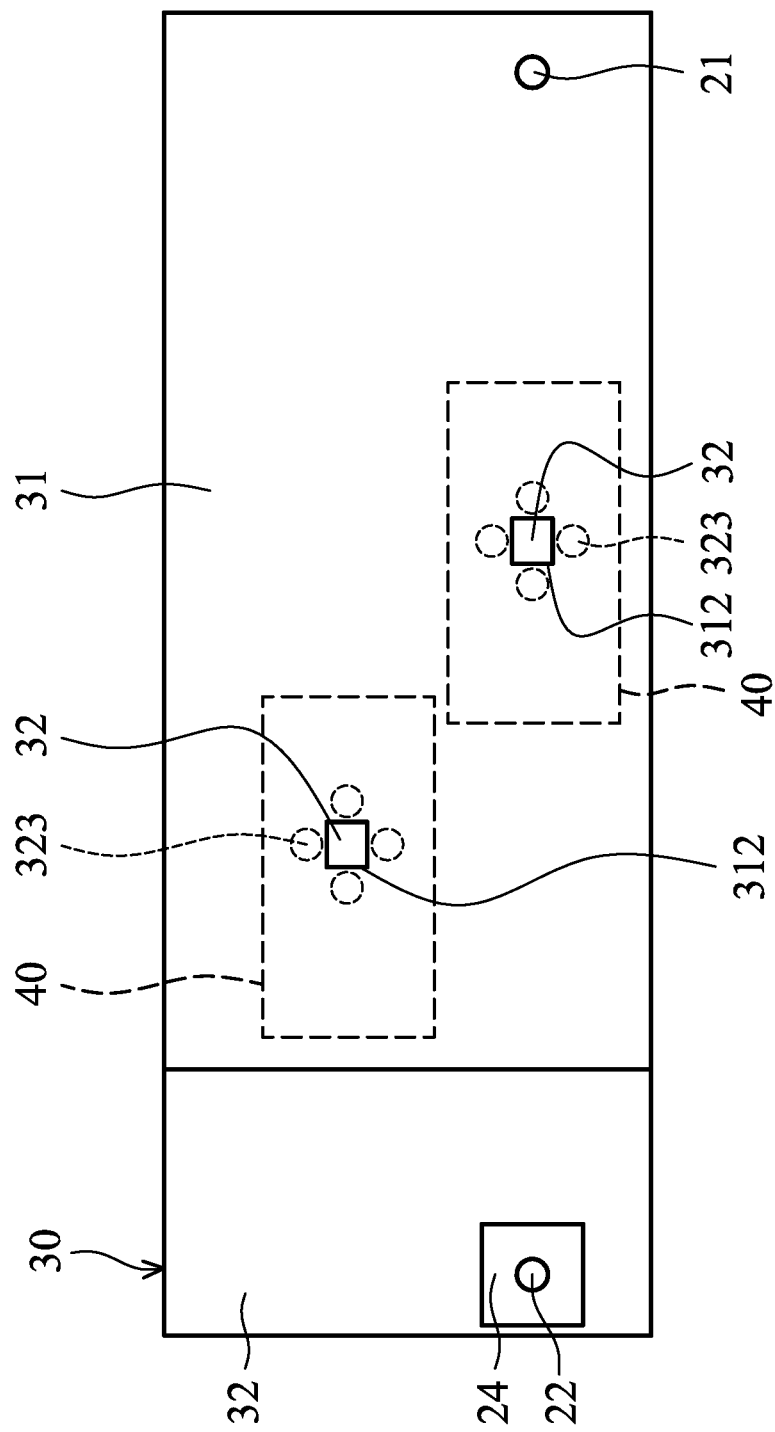
FIG. 7A is a bottom view of a second radiator in accordance with the second embodiment of the disclosure.

FIG. 7A is a bottom view of the second radiator 30 in accordance with the second embodiment of the disclosure. The second metal layer 31 may be a thin film structure covering over ⅔ of the area of the first surface 326 of the second substrate 32. The second metal layer 31 includes opening areas 312. The second substrate 32 includes connection holes 323 outside of or surrounding at least one of the opening areas 312.

The radiation conductive layer 33 may be a thin film structure. The radiation conductive layer 33 covers the connection holes 323. In this embodiment, the connection holes 323 are filled with conductive materials. The radiation conductive layer 33 is electrically connected to the second metal layer 31 via the conductive materials. The radiation conductive layer 33 includes opening areas 333 located above the opening areas 312 of the second metal layer 31.

Due to the second metal layer 31 being electrically connected to the radiation conductive layer 33 via the conductive materials in the connection holes 323, the interference is decreased when the microwave signals pass through the opening area 312 and the opening area 333, and so as to improve the modulation range of the modulation microwave device 1.

Figure 7B:
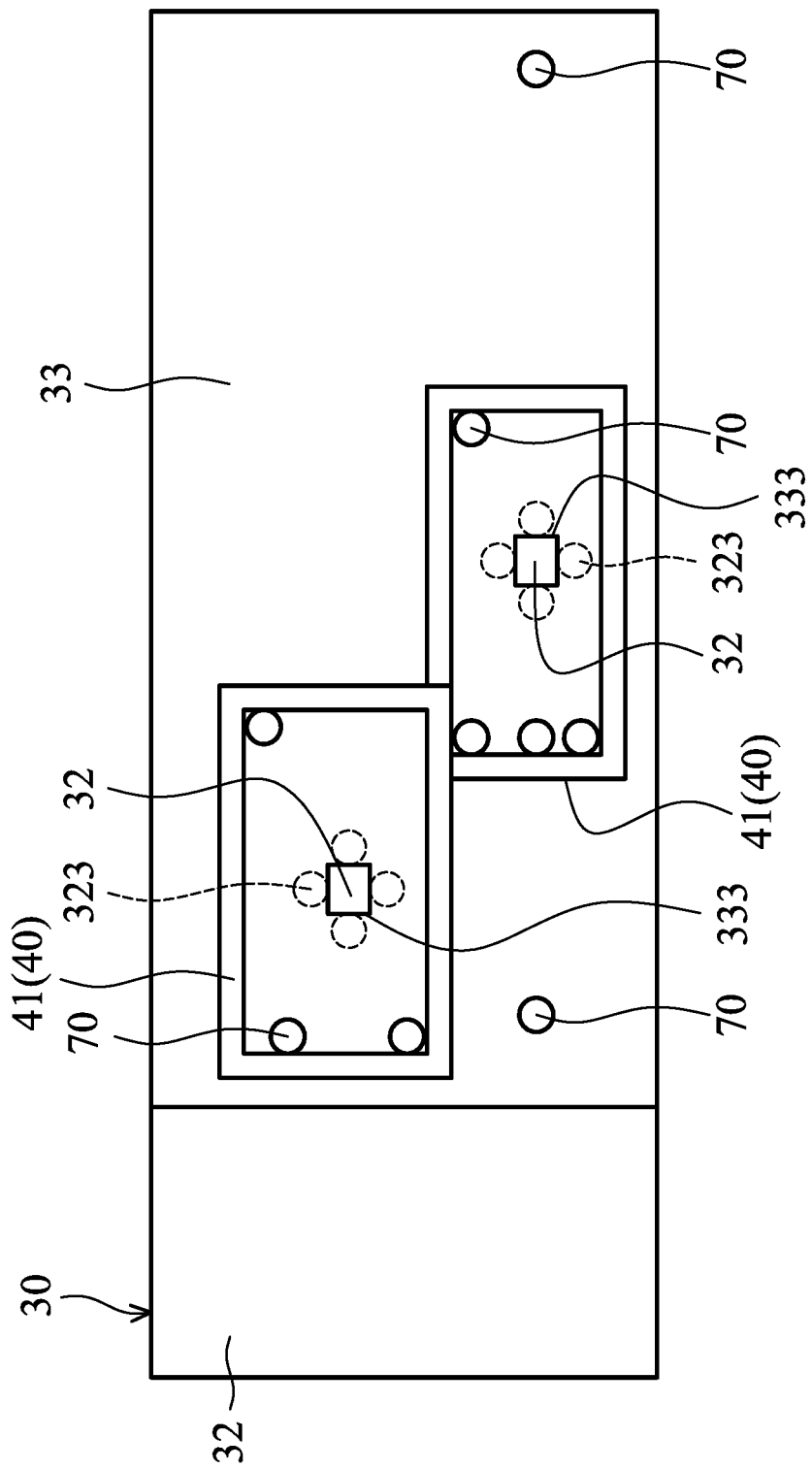
FIG. 7B is a top view of the second radiator in accordance with the second embodiment of the disclosure.
Figure 8:
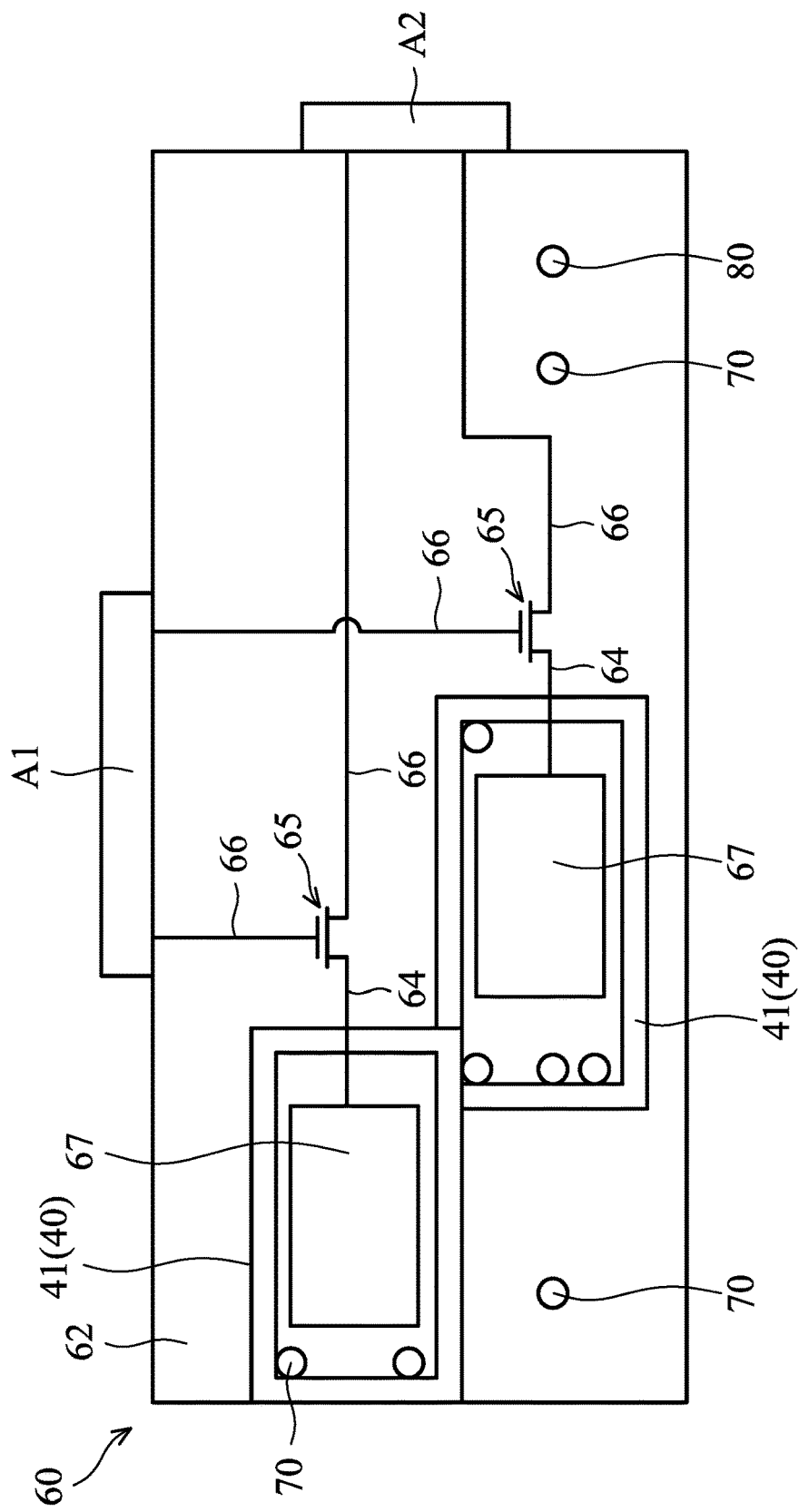
FIG. 8 is a bottom view of a third radiator in accordance with the second embodiment of the disclosure.

FIG. 7B is a top view of the second radiator 30 in accordance with the second embodiment of the disclosure. FIG. 8 is a bottom view of the third radiator 60 in accordance with the second embodiment of the disclosure. The microwave modulation device 1 includes modulation structures 40. Each of the modulation structures 40 overlaps one of the opening areas 333. In this embodiment, the opening areas 333 are substantially located under the center areas of the modulation structures 40. The conductive connection elements 50 are disposed in the modulation structure 40, and thus the strength of the modulation structure 40 is improved.

In FIG. 5, since the radiation-signal layers 67 of the microwave modulation device 1 is disposed on the third surface 623 of the third substrate 62, there is no radiation-signal layer disposed on the fourth surface 624. The radiation-signal layers 67 may be thin film structures. In this embodiment, each of the radiation-signal layers 67 is located in one of the modulation structures 40. The microwave modulation device 1 emits microwave signals via the radiation-signal layers 67.

Moreover, the third substrate 62 can be a flexible substrate or a rigid substrate. The second substrate 32 can be a flexible substrate or a rigid substrate, but it is not limited thereto.

As shown in FIG. 8, the microwave modulation device 1 further includes wires 64, thin film transistors 65 and wires 66. The wires 64, the thin film transistors 65 and the wires 66 are disposed on the third surface 623 of the third substrate 62. The wires 64 are connected to the radiation-signal layers 67 and the thin film transistors 65. One end of the wire 66 is connected to the thin film transistor 65, and the other end of the wire 66 is connected to the first processor A1 and the second processor A2.

In this embodiment, the first processor A1 is a scan-line controller, and the second processor A2 is a data-line controller. The first processor A1 and the second processor A2 transmit modulation-control signals to the thin film transistor 65 via the wires 66. The thin film transistor 65 transmits the modulation-control signals to the radiation-signal layers 67 via the wires 64 so as to control the rotation angles of the modulation molecules 421.

In some embodiments, the resistance of the wire 64 is greater than or substantially equal to the resistance of the wire 66. The resistance of the wire 66 is greater than or equal to the resistance of the radiation-signal layer 67. The resistance of the radiation-signal layer 67 is less than the resistances of the wire 64 and the wire 66. The resistances of the wire 64 or the wire 66 is greater than the resistances of the thin film transistor 65 and the radiation-signal layer (third metal layer) 67. In this embodiment, by using the wire 64 and the wire 66 with greater resistance, the interference with microwave signals is reduced.

In this embodiment, microwave signals can be fed into the microwave modulation device 1 via the waveguide structure formed by the microwave-transmission layer S1 located between the first metal layer 12 and the second metal layer 31. The microwave signals are transmitted though the microwave-transmission layer S1 between the first metal layer 12 and the second metal layer 31, and are coupled to the radiation-signal layer 67 via the opening area 312, the opening area 333, and the modulation structure 40. In this embodiment, since the microwave signals are transmitted though the microwave-transmission layer S1, the loss of microwave signals is less than the loss of microwave signals transmitted through substrates with glass.

The microwave signals in the modulation structure 40 can be emitted from the radiation-signal layer 67 to the outside of the microwave modulation device 1 or not, which is determined by the equivalent circuit formed by the radiation conductive layer 33, the radiation-signal layer 67 and the modulation structure 40.

The modulation-control signals can be transmitted into the radiation-signal layer 67 of the microwave modulation device 1 via the thin film transistor 65. Since the modulation structure 40 (such as, the rotation angles of the modulation molecules 421) can be controlled by the modulation-control signals, the modulation molecules 421 can selectively allow or block the microwave signals in the modulation structure 40 transmitted to the radiation-signal layer 67.

Figure 9:
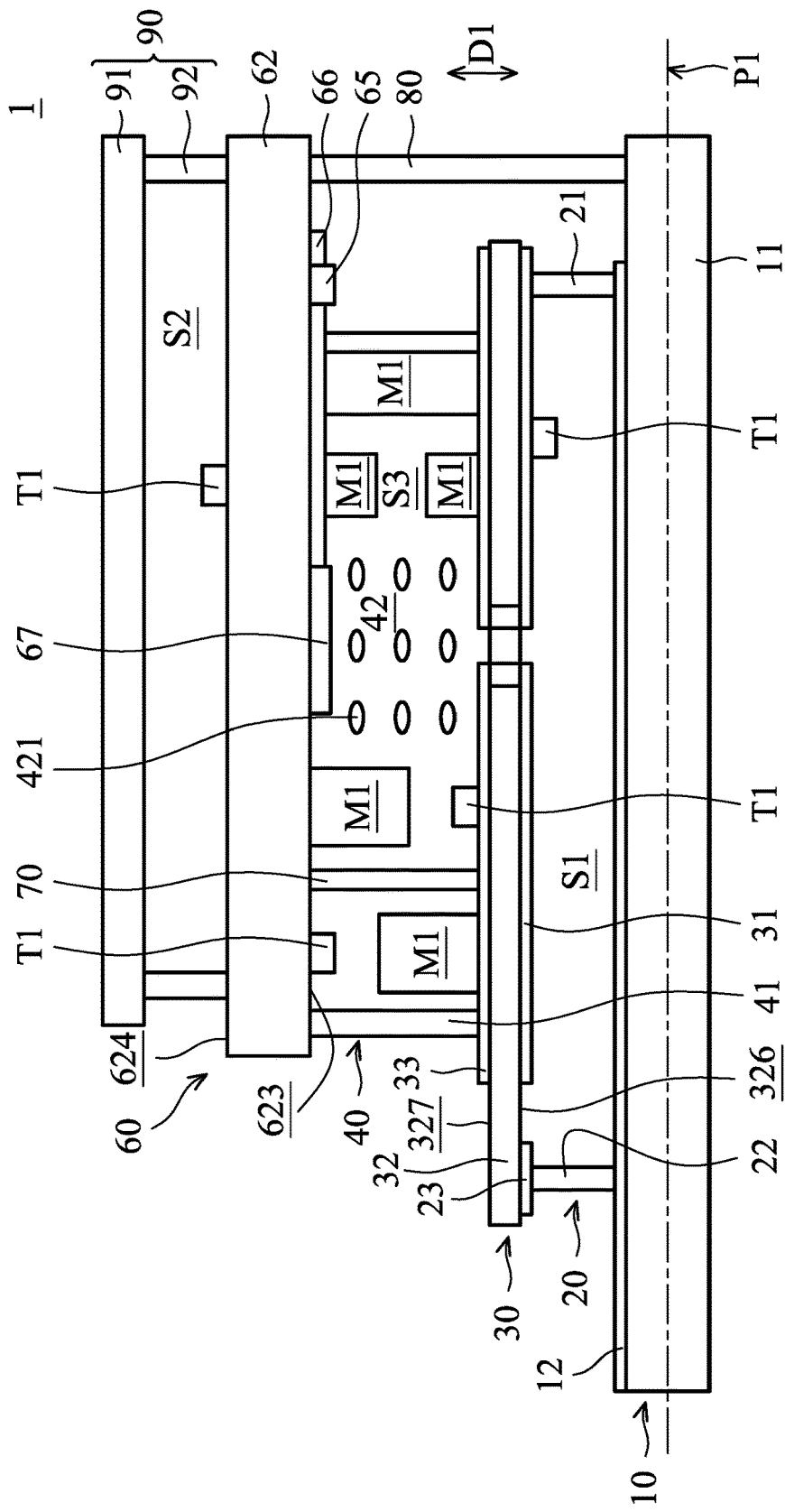
FIG. 9 is a schematic diagram of a microwave modulation device in accordance with the third embodiment of the disclosure.
Figure 10:
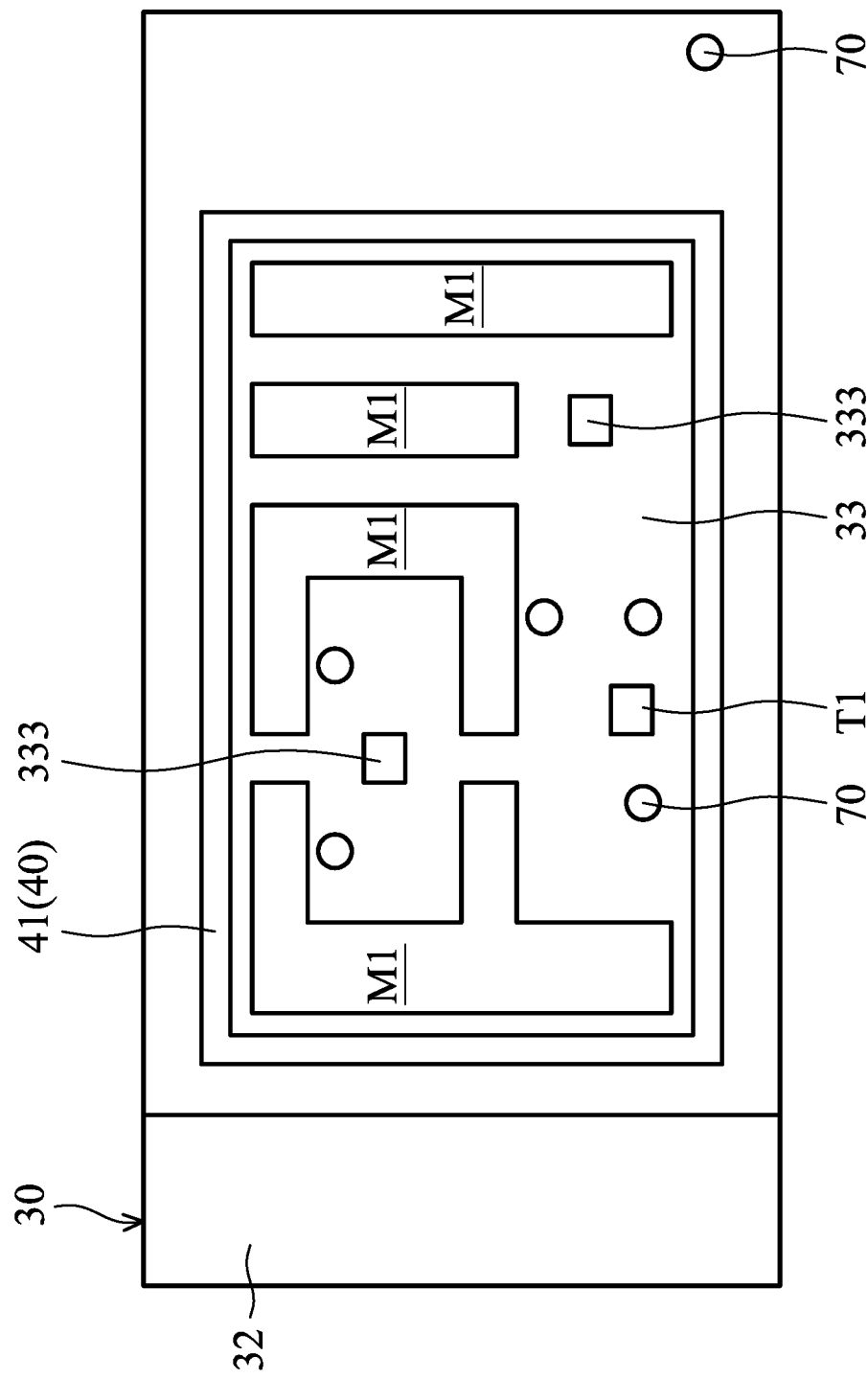
FIG. 10 is a top view of a second radiator in accordance with the third embodiment of the disclosure.

FIG. 9 is a schematic diagram of a microwave modulation device 1 in accordance with a third embodiment of the disclosure. FIG. 10 is a top view of a second radiator 30 in accordance with the third embodiment of the disclosure. In this embodiments, microwave modulation device 1 includes a heat-insulation structure 90 disposed on the third radiator 60.

The heat-insulation structure 90 includes a fourth substrate 91 and a support structure 92. The fourth substrate 91 extends along a reference plane P1. The fourth substrate 91 may be made of rigid materials or flexible materials. In some embodiments, the fourth substrate 91 is made of glass materials, or other insulation materials, such as polyimide (PI) or liquid-crystal polymer, but it is not limited thereto.

The heat-insulation layer S2 is configured to reduce the temperatures of the third radiator 60 and/or the modulation structure 40 influenced by ambient temperature. Moreover, the temperatures of the third radiator 60 and the modulation structure 40 are stable and uniform, and thus the quality of the microwave signals is improved.

The support structure 92 is connected to the third radiator 60 and the fourth substrate 91, and located between the third radiator 60 and the fourth substrate 91. The support structure 92 is configured to separate the third radiator 60 from the fourth substrate 91 and to maintain the distance between the third radiator 60 and the fourth substrate 91 so as to form a heat-insulation layer S2 between the third radiator 60 and the fourth substrate 91.

The heat-insulation layer S2 can be filled with microwave-low-loss materials. When the microwave signals are transmitted in the microwave-low-loss materials, the loss tangent of the microwave signals are lower than 0.005. In some embodiments, the heat-insulation layer S2 may be a fluid layer (such as a gas layer or a liquid layer) or a solid layer. The heat-insulation layer S2 can be filled with gas, liquid or solid. The materials of the heat-insulation layer S2 can refer to the materials of the microwave-transmission layer S1.

The microwave modulation device 1 further includes at least one of the temperature sensors T1 configured to monitor or detect the temperatures of the modulation structure 40, the microwave-transmission layer S1, and/or the heat-insulation layer S2. The temperature sensors T1 may be thin film transistors (TFTs), capacitors, or thermistors.

The temperature sensors T1 may be disposed in the modulation structure 40, the microwave-transmission layer S1, and/or the heat-insulation layer S2. In this embodiment, the temperature sensors T1 are connected to the second metal layer 31, the second substrate 32, the radiation conductive layer 33, and/or the third substrate 62.

When the modulation structure 40 is made of liquid-crystal materials, the modulation molecules 421 (liquid-crystal molecules) of the liquid-crystal material is easily influenced by temperature, and the dielectric coefficient of the modulation molecules 421 is easily changed by temperature. If the temperature of the modulation molecules 421 and the working temperature difference too much, the microwave modulation device 1 may not work properly. According to the temperature signals generated by the temperature sensors T1 detecting the temperature of the modulation structure 40, the microwave-transmission layer S1, and/or the heat-insulation layer S2, a temperature controller can properly adjust the temperature of the modulation structure 40 according to temperature signals over time. For example, when the microwave-transmission layer S1 or the heat-insulation layer S2 is filled with fluid, the fluid can be cooled or heated so as to change the temperature of the modulation structure 40.

In the third embodiment, the modulation structure 40 covers the opening areas 333. Moreover, a plurality of second support structures 70 can be disposed in the modulation structure 40.

In this embodiment, filling materials M1 can be filled into invalid areas of the modulation structure 40, wherein the microwave signals are not transmitted in the invalid areas. Therefore, the use of expensive liquid-crystal materials can be reduced, and the manufacturing cost of the microwave modulation device 1 can be reduced. The filling materials M1 can be disposed in the space surrounding by the sealing wall 41. The filling materials M1 may be made of, but not limited to, a single material or composite organic materials, such as polyfluoroalkoxy (PFA), glass glue, polyethylene terephthalate (PET), polyimide (PI), polyethersulfone (PES), mylar, polyethylene (PE), polycarbonate (PC), acrylic or Polymethylmethacrylate (PMMA). In another embodiment, the filling materials M1 are located on the radiation conductive layer 33 or the radiation-signal layer 67. When the filling materials M1 are SiOx, SiNx, or SiON, the filling materials M1 also have the effect of reducing the amount of warping of the second substrate 32 or the third substrate 62. In some embodiments, the ratio of the thickness of the filling materials M1 to the thickness of the radiation conductive layer 33 (or the radiation-signal layer 67) is in a range from 0.2 to 1, in other words, the radiation conductive layer 33 (or the radiation-signal layer 67) is greater than or equal to 0.2, and less than or equal to 1.

In some embodiments, as shown in FIG. 9 and FIG. 10, in the invalid areas of the modulation structure 40, the filling materials M1 are connected to the second radiator 30, and the filling materials M1 are separated from the third radiator 60 in the stacking direction D1.

In some embodiments, in the invalid areas of the modulation structure 40, the filling materials M1 are connected to the third radiator 60, and the filling materials M1 are separated from the second radiator 30 in the stacking direction D1.

In some embodiments, in the invalid areas of the modulation structure 40, the filling materials M1 are connected to the second radiator 30 and the third radiator 60 in the stacking direction D1. In other words, in the invalid areas of the modulation structure 40, the filling materials M1 fill the space between the second radiator 300 and the third radiator 60 in the stacking direction D1.

In some embodiments, in the invalid areas of the modulation structure 40, the filling materials M1 are connected to the second radiator 30 and the third radiator 60 in the stacking direction D1, and a gap S3 is between the filling materials M1.

In some embodiments, the second radiator 30 excludes the second metal layer 31. The second substrate 32 is a flexible substrate. There is a waveguide thickness t1 between the first radiator 10 and the second radiator 30. The waveguide thickness t1 may be a distance between the first metal layer 12 and the radiation conductive layer 33. The ratio of the thickness of the second substrate 32 to the waveguide thickness t1 is in a range from 0.001 to 0.5. The thicknesses and the waveguide thickness t1 are measured parallel to the stacking direction D1.

In conclusion, the present disclosure utilizes the microwave-transmission layer between the first radiator and the second radiator to transmit microwave signals so as to reduce the loss of microwave signals and increase the efficiency of the microwave modulation device.

The disclosed features may be combined, modified, or replaced in any suitable manner in one or more disclosed embodiments, but are not limited to any particular embodiments.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microwave modulation device, comprising:
   a first radiator;
   a second radiator disposed on the first radiator;
   a third radiator disposed on the second radiator;
   a first support structure disposed between the first radiator and the second radiator; and
   a modulation structure disposed between the second radiator and the third radiator,
   wherein a microwave-transmission layer is located in a space defined by the first radiator, the second radiator, and the first support structure,
   wherein the microwave-transmission layer is gas, substantially vacuum, liquid, or heat-insulating material.

2. The microwave modulation device as claimed in claim 1, wherein the first radiator comprises:
   a first substrate; and
   a first metal layer disposed on the first substrate.

3. The microwave modulation device as claimed in claim 2, wherein the second radiator comprises:
   a second substrate having a first surface facing the first substrate; and
   a second metal layer disposed on the first surface, wherein the second metal layer is separated from the first support structure.

4. The microwave modulation device as claimed in claim 3, wherein a material of the second substrate comprises polyimide or glass.

5. The microwave modulation device as claimed in claim 3, wherein the second radiator further comprises:
   a radiation conductive layer, disposed on a second surface of the second substrate away from the first substrate, and in contact with the modulation structure; and
   a connection layer, disposed on the second surface of the second substrate and connected to the radiation conductive layer,
   wherein the second substrate comprises a signal hole, and a conductive material is disposed in the signal hole, and the connection layer is connected to the conductive material.

6. The microwave modulation device as claimed in claim 3, wherein the second metal layer comprises a first opening area, and the second substrate comprises a plurality of connection holes disposed outside of the first opening area.

7. The microwave modulation device as claimed in claim 2, wherein the second radiator comprises a second substrate and a radiation conductive layer, and the radiation conductive layer is disposed on a second surface of the second substrate adjacent to the modulation structure,
   wherein a waveguide thickness is defined as a distance between the first metal layer and the radiation conductive layer in a normal direction of the first substrate, and a ratio of a thickness of the second substrate to the waveguide thickness is in a range from 0.001 to 0.5.

8. The microwave modulation device as claimed in claim 1, wherein the third radiator comprises:
   a third substrate disposed on the modulation structure and having a third surface facing the modulation structure; and
   a third metal layer disposed on the third surface.

9. The microwave modulation device as claimed in claim 8, wherein the third metal layer comprises a second opening area, the third radiator further comprises a radiation-signal layer disposed on a fourth surface of the third substrate, and the fourth surface of the third substrate is opposite to the third surface and away from the modulation structure.

10. The microwave modulation device as claimed in claim 9, wherein the third substrate comprises:
    a flexible substrate connected to the third metal layer; and
    a rigid substrate disposed between the flexible substrate and the radiation-signal layer.

11. The microwave modulation device as claimed in claim 8, wherein the third radiator further comprises:
    a wire, disposed on the third surface, connected to the third metal layer; and
    a thin film transistor, disposed on the third surface, connected to the third metal layer,
    wherein resistance of the wire is greater than resistance of the thin film transistor and resistance of the third metal layer.

12. The microwave modulation device as claimed in claim 1, wherein the modulation structure comprises:
    a modulation material disposed between the second radiator and the third radiator; and
    a sealing wall surrounding the modulation material.

13. The microwave modulation device as claimed in claim 1, further comprising a second support structure disposed between the second radiator and the third radiator.

14. The microwave modulation device as claimed in claim 1, wherein loss tangent of a microwave signal transmitting in the microwave-transmission layer is lower than 0.01.

15. The microwave modulation device as claimed in claim 1, further comprising a fourth substrate disposed on the third radiator, and a heat-insulation layer is located between the fourth substrate and the third radiator.

16. The microwave modulation device as claimed in claim 15, wherein the heat-insulation layer comprises a microwave-low-loss material, and loss tangent of a microwave signal transmitting in the microwave-low-loss material is lower than 0.005.

17. The microwave modulation device as claimed in claim 1, further comprising a filling material located in the modulation structure, and in contact with at least one of the second radiator and the third radiator.

18. The microwave modulation device as claimed in claim 17, wherein the second radiator further comprises a second substrate and a radiation conductive layer, and the radiation conductive layer is disposed on a second surface of the second substrate away from the first radiator, wherein a ratio of the thickness of the filling material to the thickness of the radiation conductive layer is in a range from 0.2 to 1.

19. The microwave modulation device as claimed in claim 1, further comprising a temperature sensor disposed on the third radiator, on the second radiator or in the modulation structure.

* * * * *